(12) United States Patent
Tolen et al.

(10) Patent No.: US 6,767,932 B2
(45) Date of Patent: Jul. 27, 2004

(54) METHOD AND APPARATUS FOR PRODUCING DISCRETELY STRIPED MULTI-PROPERTY FOAM

(75) Inventors: George J. Tolen, Ellicott City, MD (US); David J. Kelly, Chaddsford, PA (US)

(73) Assignee: Wm. T. Burnett & Co., Baltimore, MD (US)

( * ) Notice: Subject to any disclaimer, the term of this patent is extended or adjusted under 35 U.S.C. 154(b) by 40 days.

(21) Appl. No.: 09/874,386

(22) Filed: Jun. 6, 2001

(65) Prior Publication Data

US 2002/0188032 A1 Dec. 12, 2002

(51) Int. Cl.⁷ .............................................. C08G 18/28
(52) U.S. Cl. ........................ 521/174; 521/155; 521/170
(58) Field of Search ................................ 521/155, 170, 521/174

(56) References Cited

U.S. PATENT DOCUMENTS 3,904,557 A    9/1975   Guthrie et al.

FOREIGN PATENT DOCUMENTS

JP    62-263028    11/1987

OTHER PUBLICATIONS

"Reflecting creativity Together", Engineering Better Ideas In Foam, Swisstex Inc. (Mar. 1996).

*Primary Examiner*—John M. Cooney, Jr.
(74) *Attorney, Agent, or Firm*—Venable LLP; Michael A. Gollin; Chad C. Anderson

(57) ABSTRACT

This invention relates to methods and apparatus for producing a discretely striped, multi-property foam and the products and articles produced thereby. The invention provides a pre-foam stream at a first pressure and intermittently injects at least one additive into the pre-foam stream at a pressure higher than the first pressure, providing a laminar flow pre-foam stream with alternating segments having different properties. The pre-foam stream is poured onto a surface and cures into a discretely striped foam product which may be used for many purposes such as but not limited to padding, clothing, toys, or bedding.

13 Claims, 7 Drawing Sheets

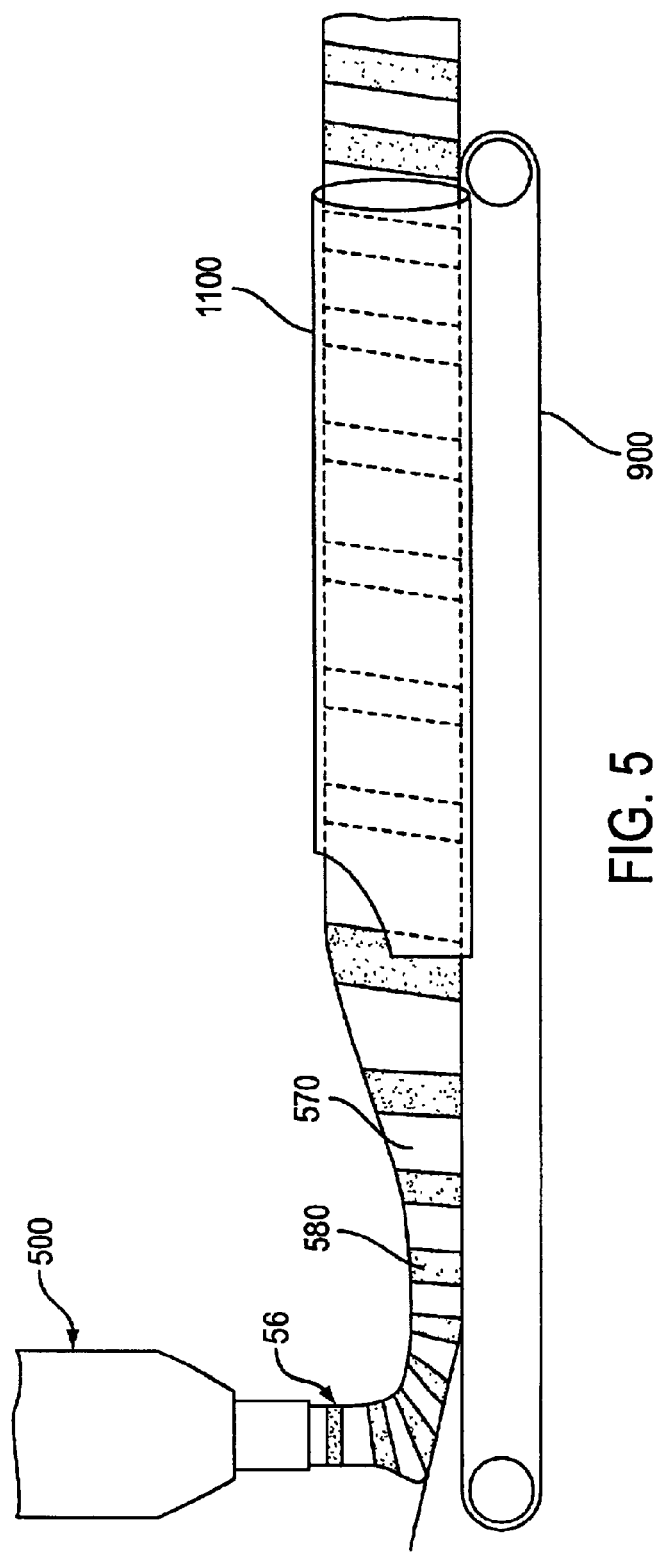

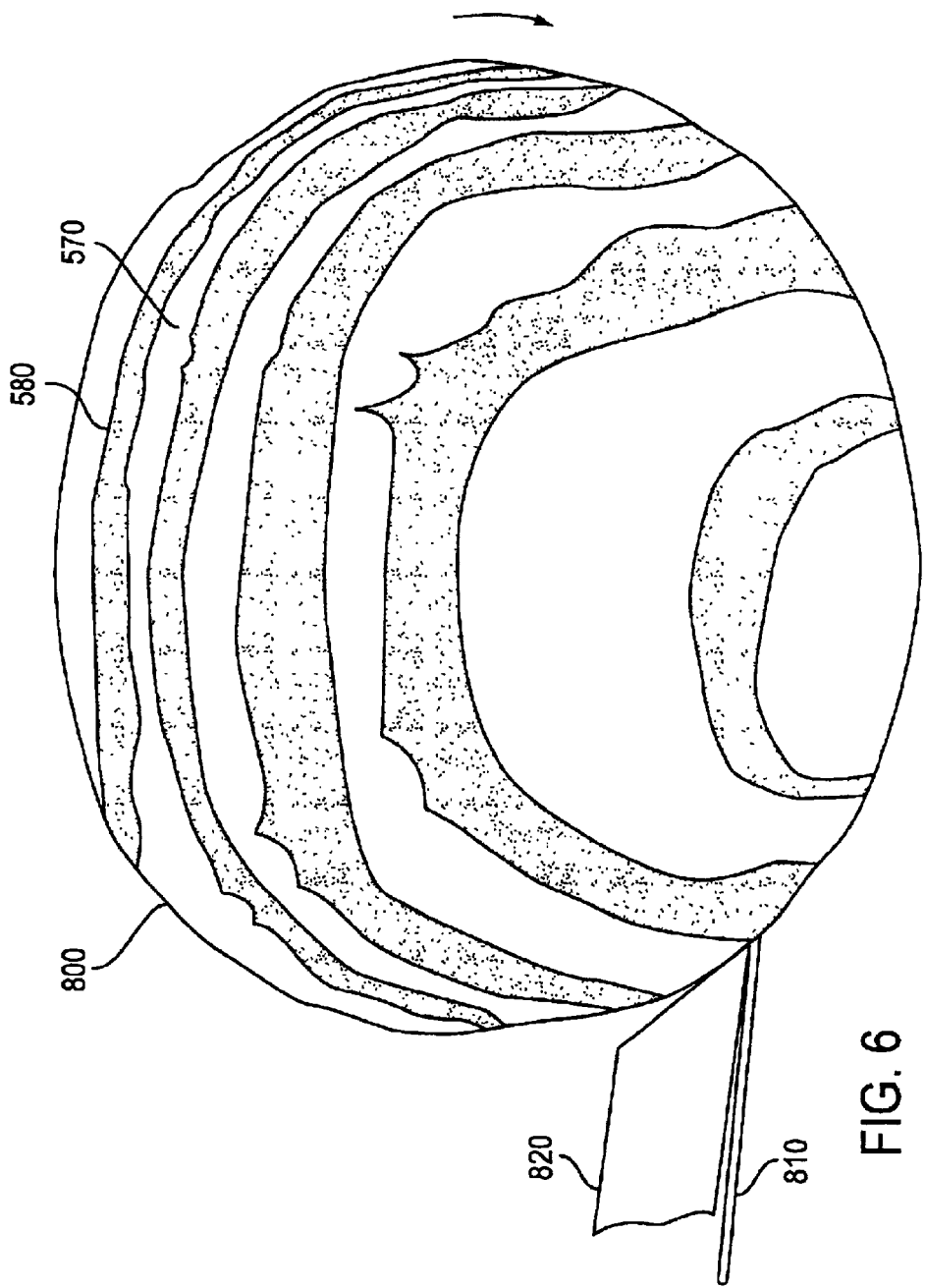

METHOD AND APPARATUS FOR PRODUCING DISCRETELY STRIPED MULTI-PROPERTY FOAM

BACKGROUND OF THE INVENTION

This invention relates to methods and apparatus for producing a discretely striped, multi-property foam and the products and articles produced thereby.

Polyol foams and their methods of manufacture are well known. These foams have many applications including: cushioning for furniture; padding for underlying carpets; seals and gaskets for a variety of uses; acoustical applications; textile laminates; energy absorbing materials; clothing; sponges; and numerous other products. Conventionally, these foams are made with homogeneous properties, and are typically monotone in color and uniform in their physical properties.

Generally, production of such foams is done with a "one shot" system where components, such as polyether or polyester polyols, surfactants and amine catalysts, flame retardants, blowing agents and other specialty additives are held separately and metered individually into a mixing chamber. The mixture of these components is "non-reactant", i.e. it has not begun the foaming process. Typically to initiate a chemical reaction an isocyanate is added which starts the foaming reaction process. The combination of these components in a mixture creates a pre-foam stream, i.e. a stream that has begun the reacting process but has not yet foamed. To combine the "non-reactant" components and isocyanate streams thoroughly, the "non-reactant" components and the isocyanate stream are passed through a mixing head. Typically the "non-reactant" components enter first with the additive streams and isocyanate entering immediately thereafter. The components are thoroughly intermixed and deposited on a surface or passed through a trough device to rise and cure. Further processing may then be performed on the cured foam to achieve a desired final product. However, the result of the typical foaming process is a foam product with a uniform, homogeneous set of properties.

Several attempts have been made to increase color variety in foam products but such processes have significant drawbacks rendering production of such foams prohibitively expensive and undesirable for various applications.

A marbleization process, although increasing the variety of colors in the resultant foams, does not provide foams with a separation of one color from those of another in a repeatable, discrete pattern. This process introduces a colorant into the foam mix in an intermittent fashion such that the foam coloration is intermixed and marbleized, as seen in FIGS. 1 and 2 of Japanese patent JP62263028. This process cannot achieve discretely striped foam with a variation in color. A more regular, controlled pattern is often desired in products, for instance in the area of clothing, blankets, and novelty items to achieve a particular visual effect. The intermixing of colors in the marbleization process is so significant that no controlled visual effect is achievable. The marbleization process is only capable of providing an end product that is a wild jumble of colors.

A process to merge continuous disparate reactant foaming streams of different colors in a single foam product with heterogenous regions of color is described in U.S. Pat. No. 3,904,557. The multiple reactant streams flow in parallel and are in a liquid form when poured. Preferably they are poured through a "heterogenous blender", separating each stream with a divider plate, while mixing the compositions between the plates to promote the foaming process. Some intermixing inherently occurs when the streams hit the surface upon which they are being laid out or, alternatively, may be intentionally provided as suggested by the reference. This is likely to create a variegated pattern within the foam mass, similar to marbleization. The '557 process then attempts to lay up the two streams of foam while they cure or just after they are poured next to one another. The resulting product inherently has a seam which would be susceptible to separation, thus making the use of these products impractical at best in any application requiring durability, such as cleaning products, blankets and clothing. The '557 process also suffers from the increased costs in labor, machines and space for mixing, pouring, transporting and curing the multiple foam streams prior to laying them up to bond.

SUMMARY OF THE INVENTION

Despite numerous past efforts, no process has been able to achieve a cost effective, discretely striped, multi-property, segmented foam. There exists a need for a method and apparatus to produce a product having discretely striped, multi-property segments that are varied to provide distinct differentiation of properties between the segments. Such an apparatus and method would allow for increased flexibility in the variety of applications in which such a foam could be used and greater variety, particularly in the coloration of foams in general. The new system must be cost effective, preferably needing only a single foam stream. The new system should provide a durable, repeatable, discretely striped foam for commercial applications. For instance, specific commercial applications that would benefit include but are not limited to the production of blankets, clothing articles, novelty items, and similar applications.

An object of the invention is to provide a method and apparatus for producing a foam product with repeatable, discretely striped multi-property segments.

A further object of the invention is to provide a cost-effective process to produce seamless repeatable, striped, multi-property, segmented foams requiring no adhesives or bonding.

Another object of the invention is to provide a process of producing multi-property foam in a single stream.

A still further object of the invention is to provide a mixing head for manufacturing repeatable, striped, multi-property, segmented foam.

An additional object of the invention is a distinct and predictable, striped, multi-property segmented foam product.

The invention provides a process, and a foam product produced by the process, comprising the steps of providing a pre-foam stream at a first pressure, intermittently injecting an additive into the pre-foam stream at a pressure higher than the first pressure, providing a laminar flow pre-foam stream with alternating segments, pouring said laminar flow pre-foam stream onto a surface, and curing said pre-foam stream into a foam product having discrete alternating stripes or segments with different properties.

The stripes or segments of the foam can vary in chemical composition. Preferably, the additive is a coloring agent and the alternating stripes or segments vary in color. The additive may vary given ratios of at least one of a polyol, an isocyanate, and water. The product may have two or more different types of alternating stripes. The product may be a clothing article or a blanket or an insulator.

The method may further comprise the step of conveying the poured pre-foam stream in a direction generally perpendicular to the direction of pouring of the pre-foam stream. The pre-foam stream can be poured at an angle to minimize the intermixing of the pre-foam stream. The segments of the alternatingly segmented pre-foam stream are preferably generally perpendicular to the flow of the pre-foam stream. The segmented pre-foam stream can also be poured to produce an alternatingly striped foam bun rotatable about an axis of rotation. The method can further comprise pouring the pre-foam stream into a cylindrical or a rectangular form. The method can further comprise the step of pouring the pre-foam stream into a trough.

The method may also comprise peeling a striped layer or sheet of foam from the circumference of the foam bun to provide stripes generally at an angle to the axis of the cylindrical bun. The method can also include cutting a rectangular or other discretely striped foam shape from the bun.

The pre-foam stream can be provided by mixing a non-reactant stream with an isocyanate to produce a pre-foam stream. The method can include injecting the at least one additive into a laminar flow region of the pre-foam stream, providing a laminar flow segmented pre-foam stream, and/or simultaneously injecting at least one additive from at least two points of injection or, at different times, injecting at least one additive from at least two points of injection.

The method may include varying the time interval between intermittently injecting the at least one additive, or pulsing the injector orifice open and shut or varying the size of opening of the injector orifice.

The additive may be a unique marker compound or combination of compounds that can be associated with the foam product as a unique identifier. Or the additive can vary at least one of density, hardness, thickness, air permeability, tensile strength, and load bearing capacity properties of said foam. The pre-foam stream typically comprises a polyol, an isocyanate and water at given ratios. The at least one additive may vary the ratios of at least one of the polyol, isocyanate or water. The additive can comprise water or the additive may vary the polyol component of the pre-foam stream as well.

The invention further includes an article of manufacture comprising a seamless foam product having a plurality of stripes, each stripe having at least one property different from adjacent stripes. The at least one different property can comprise color, density, hardness, width, air permeability, tensile strength, and load bearing capacity. The article can be a cushioning product, a clothing product, or a bedding product. The article may have discrete stripes running predominantly perpendicular or at an angle to an axis of rotation, or to the surface of the article.

Additionally, the invention includes a method for making a foam product comprising a step for producing a pre-foam stream with a step for achieving discrete segments across the entire pre-foam stream and a step for forming a cured, discretely striped foam. The cured discretely striped foam is preferably a cylindrical bun or a rectangular mass.

The invention also provides for a method of making a striped foam, comprising, in order, the steps of preparing a pre-foam stream, intermittently injecting into the pre-foam stream an additive to form a pre-foam stream having alternating segments and pouring the pre-foam stream onto a surface, the stream curing into a multi-segmented foam having a controlled variation in properties.

An advantageous apparatus of the invention comprises a device, preferably a foam mixing head, having a mixing chamber with at least one inlet introducing components of a pre-foam stream and mixing and passing said at least one pre-foam stream at a first pressure through the chamber. The apparatus preferably includes at least one injector introducing an additive into said mixing chamber at discrete time intervals and at a pressure higher than said first pressure and an outlet, discharging a laminar flow of an alternatingly segmented pre-foam.

The foam mixing head preferably has a single pre-foam stream in the mixing head. The single pre-foam stream preferably includes an isocyanate. The injector can introduce the additive at a pressure of about 10 to about 1000 psi, preferably about 200 psi. The injector preferably ports into a laminar flow region of the mixing head and can be located generally adjacent to the outlet of the mixing chamber. The mixing head can include a programmable control unit coupled to the at least one injector and providing a predetermined pattern of alternating injection and non-injection.

The pattern of the controller can vary the duration of injection and the duration of non-injection. The injector preferably has a cycle time from open to close of about 0.1 seconds to about 10 seconds. The injector may also have a variable sized orifice for injecting additive. The mixing head may be included in a machine preferably comprising the mixing head and a conveyor located beneath the outlet of the mixing head and receiving the alternatingly segmented pre-foam stream, with at least one non-reactant materials tank, at least one isocyanate tank, at least one pressurized pre-foam stream feed line and at least one pressurized isocyanate line at a first pressure, and at least one pressurized additive feed line in communication with the mixing head at a second higher pressure. The mixing head may be either stationary or in motion with respect to the conveyor. In addition, a trough or other spreading device may be used to spread the pre-foam stream across the width of the conveyor.

A still further advantageous apparatus of the invention comprises means for providing a pre-foam stream at a first pressure, means for intermittently injecting an additive into the pre-foam stream at a pressure higher than said first pressure, providing a laminar flow pre-foam stream with alternating segments, and means for pouring the pre-foam stream onto a surface, to provide a discretely striped, multi-property foam bun.

The means for intermittently injecting may include at least one injector, the at least one injector preferably injecting the additive into a laminar region of the pre-foam stream while substantially maintaining the laminar flow in the laminar flow region. The apparatus can further comprise a means for controlling the means for intermittently injecting.

The means for controlling the intermittently injecting means may vary the time interval between intermittently injecting and not injecting the additive, wherein the preferred time interval is at least about 0.1 second at most about 10 seconds. The means for controlling the intermittently injecting means can also pulse an injector orifice open and shut or it may control the injector means by varying the size of the orifice of the injector means.

The forming means can comprise a means for pouring said alternatingly segmented pre-foam stream into a form. The form may preferably be a tubular form or a rectangular form. The form may be lined with a separator.

The invention also includes a system for producing a striped foam product, comprising a mixing head for providing a pre-foam stream and at least one injector for injecting an additive into said pre-foam stream to produce a discretely segmented pre-foam stream. The system may preferably include at least one surface for supporting and curing the segmented pre-foam stream into a striped foam bun.

The surface is preferably a conveyor, located at an outlet of the mixing head and receiving the discretely segmented, pre-foam stream. The mixing head is preferably static with respect to the conveyor. The system preferably also includes at least one non-reactant materials tank in communication with the mixing head and providing a pre-foam stream through at least one pressurized pre-foam stream feed line, at least one isocyanate tank in communication with the mixing head and providing an isocyanate stream through at least one pressurized isocyanate line, at least one pressurized additive feed line in communication with the mixing head and providing additive, at least one programmable control unit, and a conveyor for conveying and curing the pre-foam stream mass. Preferably, the control unit controls the three-way valve and intermittently injects the additive at a specified time interval. The control unit may do this by varying the time interval between intermittently injecting and not injecting the additive.

The above objects and advantages of the invention are illustrative and not exhaustive of those which can be achieved by the invention. Thus, these and other objects and advantages of the invention will be apparent from the description herein, both as embodied herein and as modified in view of any variations which would be apparent to those skilled in the art.

BRIEF DESCRIPTION OF THE DRAWINGS

Embodiments of the invention are explained in greater detail by way of the drawings, where the same reference numerals refer to the same features.

FIG. 5 is a perspective view of the process of pouring;

FIG. 6 is a cross sectional side view of a foam bun also showing the peeling blade for producing the sheet product of the instant invention.

DETAILED DESCRIPTION OF THE INVENTION

Figure 1:
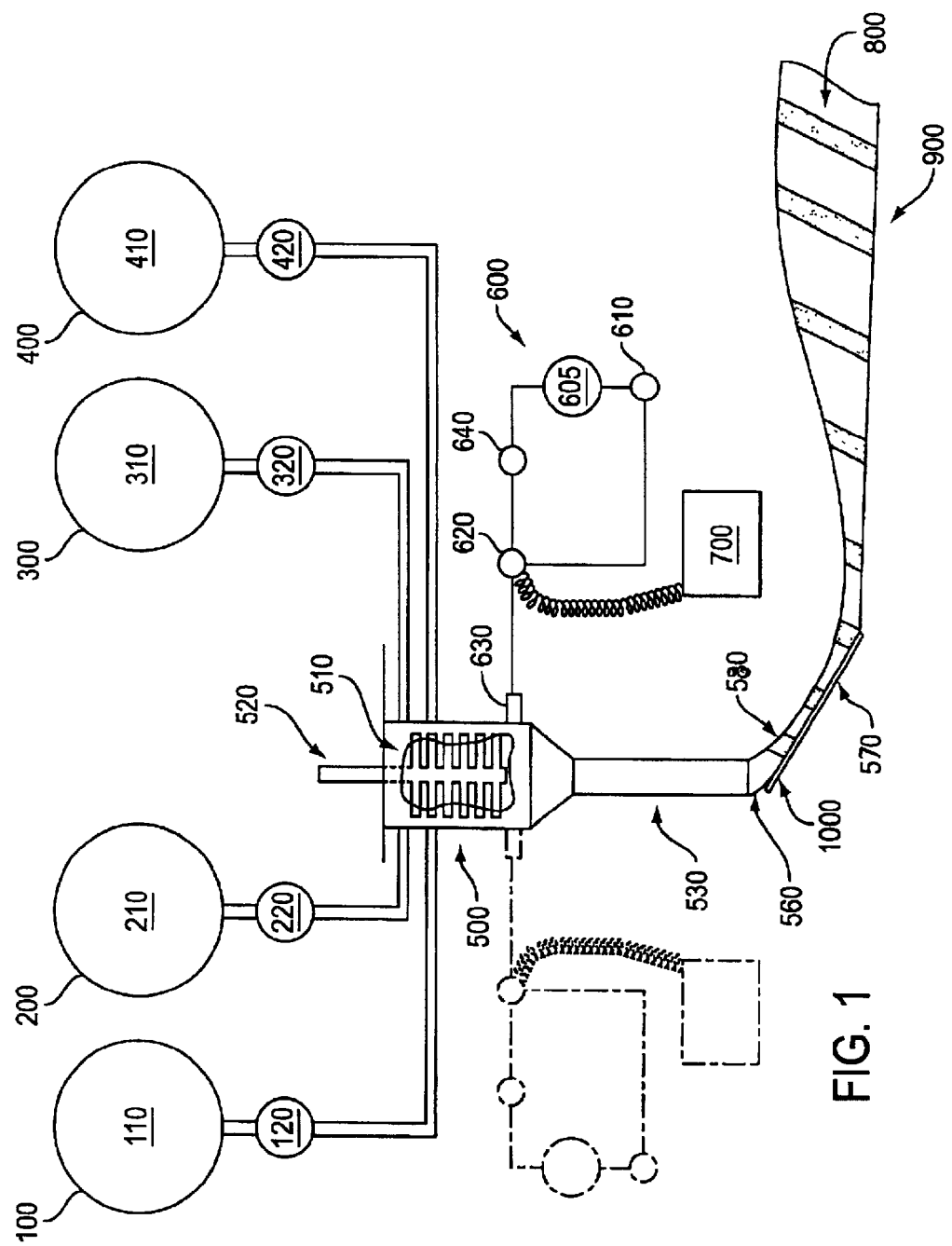
FIG. 1 illustrates a schematic view of a preferred embodiment of the invention.

In describing preferred embodiments of the present invention, specific terminology is employed for the sake of clarity. However, the invention is not intended to be limited to the specific terminology so selected.

In reference to the invention, a non-reactant stream may compromise a single polyol or a mixture of polyols, and possibly additive(s), such as but not limited to, a surfactant, an amine catalyst, and or a blowing agent. These components may be wholly premixed or individually added and mixed at the initial introduction to the mixhead prior to the introduction of an isocyanate. A non-reactant stream is one in which the polyol component(s) has not initiated a chemical reaction that would produce a foam product. In other words, the foaming process has not begun in a non-reactant stream. Examples of appropriate components for use in a non-reactant stream include, but are not limited to: polyols—generally any compound that terminates in hydroxy (—OH) groups, such as polyesters, polyglycols, and polyethers; amine catalysts; and blowing agents.

An additive is generally any substance injected to the non-reactant or pre-foam stream to change a characteristic or property of the segment into which it is injected. Non-limiting examples of additives include coloring agents, further amine catalyst, additional foaming products, markers, unique identifying agents, water, additional polyol, isotopes, chemical combinations to vary density and any agent which would distinguish one segment of foam from another or vary the properties of the segment. Additives may also vary the type of reaction or rate of reaction for producing the foam product or combinations of different types of reactant agents in the form of admixtures or solutions.

Properties that may vary as a result of additive injection in the instant invention include but are not limited to density, hardness, thickness, air permeability, tensile strength, load bearing capacity, and any physical property that may be desirous in a product. Each of these properties is a function of the chemical composition, physical and chemical ratios and reactions among polyols, an isocyanate, water and additives. By utilizing the instant invention, not only can multi-color discretely striped foam be produced but also foam with variations in chemical and/or physical properties occurring between the discrete segments.

For example, by intermittently varying the amount of water that is injected into the pre-foam stream, a multi-density foam is possible. Similarly, by varying the nature of the polyols by intermittently injecting and enhancing them, a foam having different load bearing properties can be made. Combinations of the variations in properties are also possible, for instance foam with varying load-bearing characteristics in which the different load bearing segments have different colors is possible. Thus, varying the amount or type of flame retardant, catalyst and other additives leads to other multi-property foams suited to a wide range of particular applications, a non-limiting example being the cushioning segment of the furniture industry.

An isocyanate initiates the chemical reaction for the foaming process. The isocyanate is typically a polymerization agent, generally an isocyanate or polyisocyanate, such as TDI, MDI or other organic mono-isocyanate or di-isocyanate, in the case of polyol pre-foam stream components, and is used to initiate a chemical reaction, as is readily apparent to a person of ordinary skill in the art.

A pre-foam stream generally refers to a stream that is the combination of a non-reactant component stream (with one or more of an amine catalyst, surfactant, blowing agent) and an isocyanate stream added separately to commence the reaction to produce the final foam product. Alternately, a pre-foam stream may not require the introduction of a separate isocyanate stream within the mixhead. For instance, non-reactant stream and the isocyanate stream may be pre-mixed and provided to the mixing head of the instant invention and as such the amine catalyst, surfactants and blowing agents would be added to the pre-foam stream in the mixhead. Generally a blowing agent and surfactant are either included in the non-reactant stream or introduced into the pre-foam stream separately. An amine catalyst can also be added to the reactant pre-foam stream, mixed with the surfactant or the blowing agent, or it can be added separately. In reference to the invention, the reactant pre-foam stream begins with the introduction of the isocyanate stream to the non-reactant stream, and continues as the resultant mixture creams (via the production of carbon dioxide gas bubbles in the liquid), and rises and cures to become foam. The foam product is achieved when the pre-foam stream has set and cured throughout.

The multi-property segmented pre-foam stream and foam products of the invention are novel in the industry. The foam and pre-foam stream have a distinct and repeatable demarcation, segmentation, striation, or stripe, which distinguishes a segment having one property from a segment having a variation of that property or a distinctly different property. Some examples of properties that might be varied or changed include but are not limited to: color, density, chemical composition, or any other relevant characteristic of a foam product.

As used here, discrete stripe or segment is any clear demarcation, segmentation, striation, variegation, banding, streak, or stripe that is predictably repeated in a pattern with both a beginning and an end. The stripe may have a sharp contrast or may be a gradient, depending on the speed at which the additive is introduced and the interval between opening and closing of the injector. However, the stripe is repeatable in a predictable, controllable manner and has a clear starting point and a clear ending point. The stripe width can alternate (e.g. thin-thick-thin). In addition, the stripe width can vary by any dimension within the confines of the foam bun.

The non-laminar or turbulent region is the region in the mixing head in which the mixing of the primary active ingredients of the pre-foam stream are thoroughly intermixed. By mixing the polyol with the isocyanate, the blowing agent, the surfactant and any additional additive(s), the chemical reaction that instigates the foaming process is begun in the turbulent region.

The laminar region is a region after the turbulent zone of the mixhead in which laminar flow or a minimum of intermixing of the stream is maintained as it changes from a non-reactive foam stream to the pre-foam stream. Preferably, the additive is injected at the end of the turbulent zone of the mixhead. The injection occurs in a way that allows for a uniform mixing of the additive in the pre-foam stream but minimizes intermixing between the segments with the injected additive or with other subsequent areas of injected additive in the resultant pre-foam stream. The additive is not intermixed with the pre-foam stream in such a way as to wildly jumble the demarcation or shape of the pre-foam stream and, thereby, the stripes in the resultant foam. Generally, the edges of adjacent stripes in the finished foam remain roughly parallel to each other without intersecting each other, and perpendicular to the direction of flow. The exact shape and pattern of the discrete stripes of the invention can be varied depending on the many parameters listed here and others that will be apparent to a person of ordinary skill.

Apparatus

Figure 2:
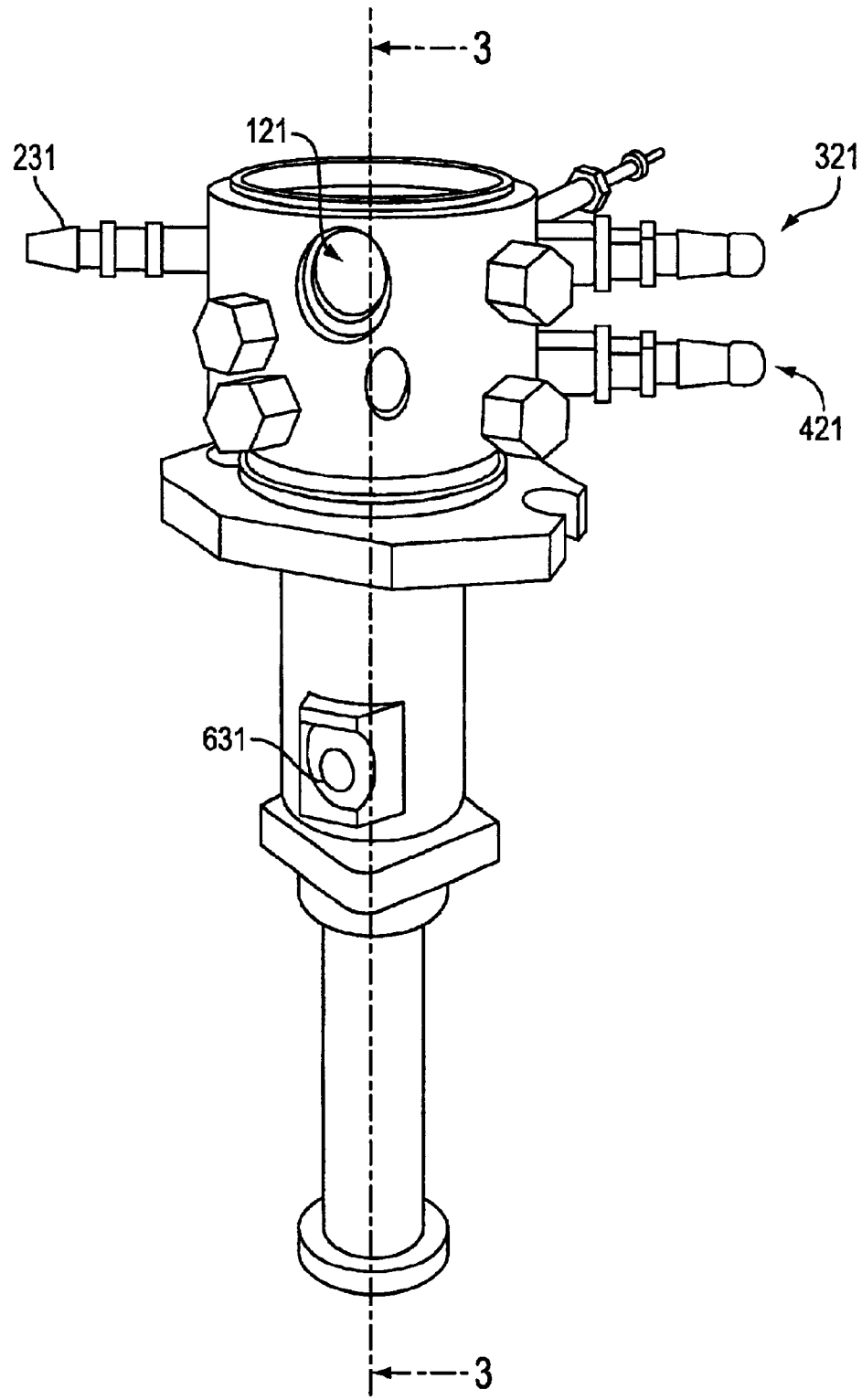
FIG. 2 is a perspective view of a preferred embodiment of the mixing head of FIG. 1.
Figure 3:
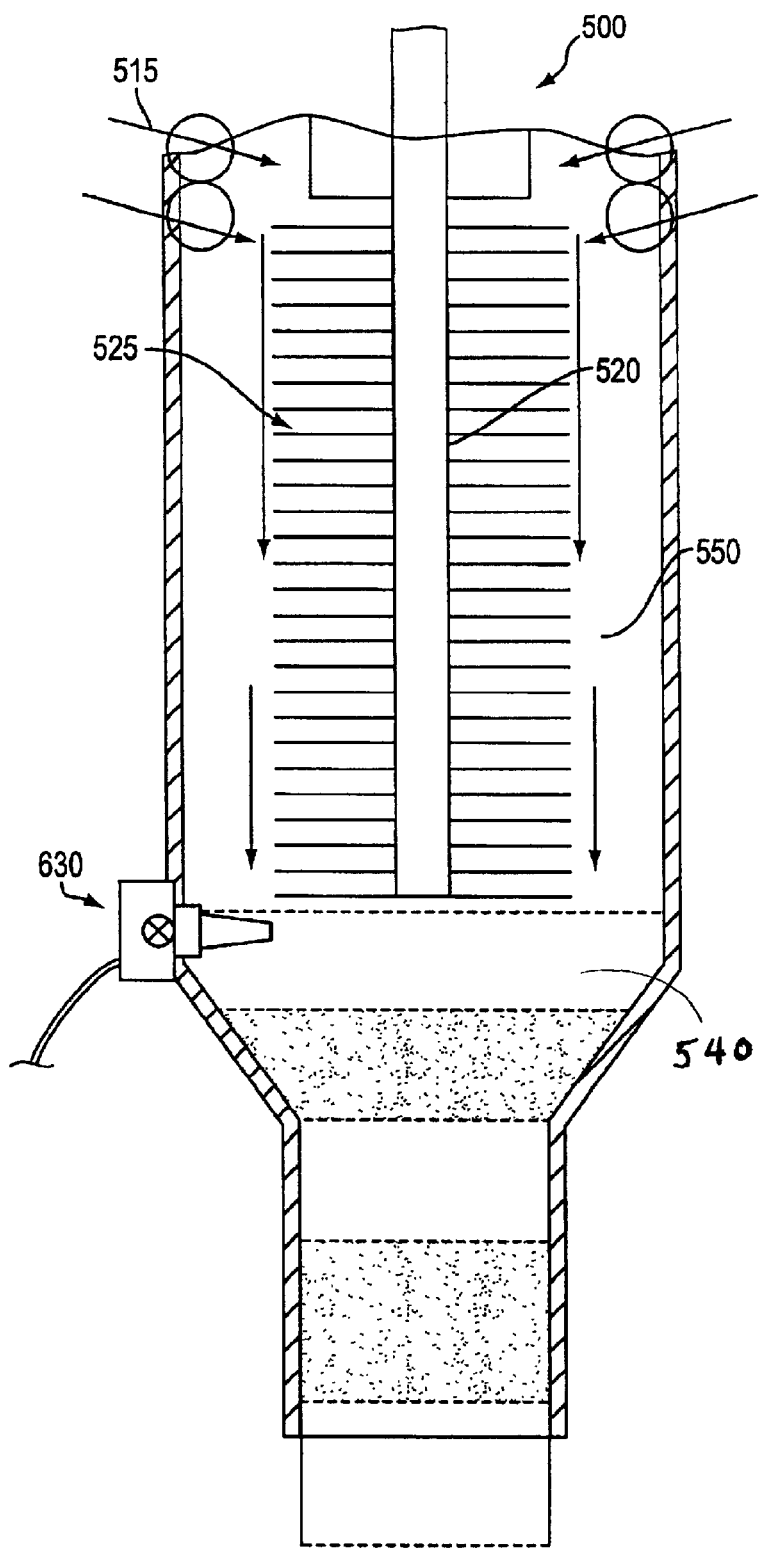
FIG. 3 is a cross sectional view of the mixing head of FIG. 2 along line 3—3.

FIGS. 1–3 describe a preferred embodiment of the device for carrying out aspects of the instant invention. FIG. 1 illustrates a schematic view of the invention. Seven primary sub-systems are shown in the preferred embodiment. These include a non-reactant polyol component subsystem 100, a non-reactant water subsystem 200, a non-reactant subsystem 300 for providing at least one of an amine catalyst, blowing agents, or surfactants, or mixtures thereof, an isocyanate sub-system 400, a mixhead 500, a segmenting additive subsystem 600 and controller 700.

The non-reactant polyol sub-system 100 is comprised in its most basic form of a main storage tank 110 containing a first non-reactant component, typically polyol(s). Although a single tank is shown, as with all the sub-systems, multiple tanks may be provided without departing from the spirit of the invention. Additionally, all systems can be provided with various well-known safety features, such as pressure relief valves and recirculation lines, which are omitted in this description. The main tank 110 feeds a pump 120, which pressurizes the subsystem and is connected to the primary feed line to the mixhead 500.

The non-reactant water sub-system is similar to the non-reactant polyol subsystem 100, comprising a water tank 210, a water pump 220 which pressurizes the subsystem, and a feed line connecting to the mixhead 500.

The non-reactant subsystem 300 provides at least one of an amine catalyst, blowing agents, or surfactants, or mixtures thereof to the mixhead 500. It comprises a tank 310, and a pump 320 that pressurizes the subsystem and is connected to the feed line to the mixhead 500.

The isocyanate subsystem 400 supplies the isocyanate to the mixhead 500 and comprises a tank 410, a pump 420 that pressurizes the sub-system and is connected to the mixhead 500. The mixhead 500 comprises a mixing chamber 510, a pin-type mix-shaft 520 and an outlet tube 530. These subsystems 100–500 are well known in the industry and one of ordinary skill in the art would be well versed in the construction and method of operation of these sub systems. Further, variations in the configuration of these subsystems may be made without affecting the invention.

The segmenting additive subsystem 600 injects additives that vary the properties and chemical composition of the reactant mixture. The preferred embodiment comprises a tank 605, a pump 610, a three-way directional valve 620, an injector 630, and a pressure relief valve 640. The pressure relief valve 640 provides a residual pressure in the system that is greater than the pressure of the reactant stream in the mixhead 500. The injector 630 provides a complete shutoff of liquid flow into the mixhead 500 and prevents the back-flow of the reactant stream into the subsystem 600. The additive pump 610 causes a liquid flow through the three-way directional valve 620 either through the injector 630 and into the mix head 500 or through the pressure relief valve 640 to return to the tank 605. The injector 630 opens when the three-way valve directs the liquid flow to the mixhead 500 and instantly closes when the directional valve 620 diverts the flow back to the tank 605. An alternative embodiment of the invention utilizes a second segmenting additive subsystem (shown in phantom in FIG. 1) to inject into the mixhead from a second position. Further embodiments are contemplated utilizing a further plurality of the segmenting additive sub-systems at different injection points.

The controller 700 comprises a programmable controller for actuating the three way valve(s) 620 in the preferred embodiment. In alternative embodiments, the same controller can be utilized to control all available segmenting additive sub-systems or separate controllers can be provided for the various subsystems without departing from the spirit of the invention.

The injector(s) 630 provides for the discrete foam segments associated with the instant invention. Through controlled introduction of the additive into the laminar flow region 540 of the mixing head 500, the segmented pre-foam stream 550 is achieved. The controller 700 controls the three-way valve(s) 620 which causes pressure from the pump 610 to open the injectors 630 and inject the additive into the mix head 500.

The mixing head 500 combines the non-reactant steams 100, 200, 300 and the isocyanate stream 400 and intermixes them. The mixing head 500 is also the point at which the additives from subsystem(s) 600 are introduced at a substantially higher pressure than that of the pre-foam stream 550. The result is a repeatable, segmented foam stream 560, which pours from the mixing head 500. Pre-foam stream 560 has segments that result in a foam with a set of base properties 570 alternating with segments having altered properties 580. Foam stripes resulting from the pre-foam stream 560 are variable in width as well as in physical properties, the determination of which is controlled by three-way valve 620.

FIG. 2 is a perspective view of a preferred embodiment of the mixing head of FIG. 1. A close up of the mixing head 500 is shown with an opening 121 for introducing polyol(s) from sub-system 100 and for the injection of chemicals from the sub-systems 200, 300, 400 and 600 through ports 221, 321, 421, and 631 respectively. Although FIGS. 1–3 show a preferred embodiment of the mixhead, variations in the design and the necessary porting are contemplated, including variations in which a pre-mixed pre-foam is provided, eliminating the need for mixing various constituents within the mixhead. Additionally, means for mixing other than mixing trees are also contemplated.

FIG. 3 is a cross sectional view of a preferred embodiment of the mixing head along line I—I. This cross sectional view shows the mixing head 500 with a mixing tree 520 to promote intermixing of the non-reactant streams 515 and the isocyanate 400 within the turbulent flow region 525. The vortices within the flow of the two streams are created by the mixing tree and aid in the thorough intermixing of the two streams 515 and 400 into the pre-foam stream 550. The injector nozzle 630 is shown in FIG. 3 at a point just below the mixing tree 520 in the laminar flow region. Preferably, the additive 400 is injected into the pre-foam stream 550 in the laminar flow region.

The controller 700 controls the three-way valve 620 in a programmed sequence to divert the additive through the injector 630 which opens and shuts, thus injecting the additive 600 into the mixhead 500 at a substantially higher pressure then existing in the mixing head and the pre-foam stream, the pressure being high enough to force the additive into and throughout the cross-sectional area of the pre-foam stream. While the technique of injecting the additive 400 at the substantially higher pressure than that of the pre-foam stream 550 may be performed at various points between the inlet non-reactant stream 100 and the isocyanate 400 to the outlet of the pre-foam stream 560, the preferred repeatable, discrete stripe foam of the invention cannot be easily achieved when such injection occurs in the turbulent zone of the mix head.

The controller 700 is programmed to vary the duration of the injection by controlling the duration of movement of the three-way valve 620. By varying the duration of the injection, the width of the segments in foam stream 560 is varied. Varying the speed with which the injector 630 is opened and shut, also allows for variation in the chemical composition between segments and, thereafter, different physical properties in the resulting foam stripes that have been affected by the injection.

Figure 4A:
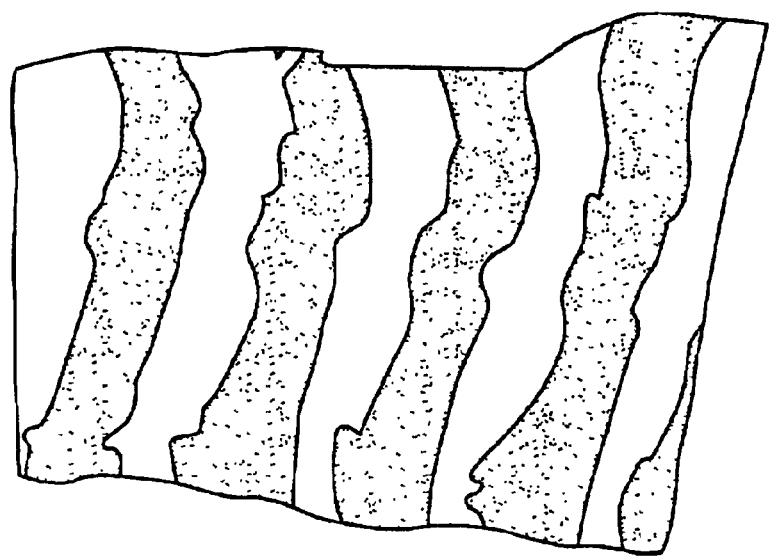
FIGS. 4a and 4b are perspective views of two foam articles produced by the instant invention.
Figure 4B:
Figure 7:
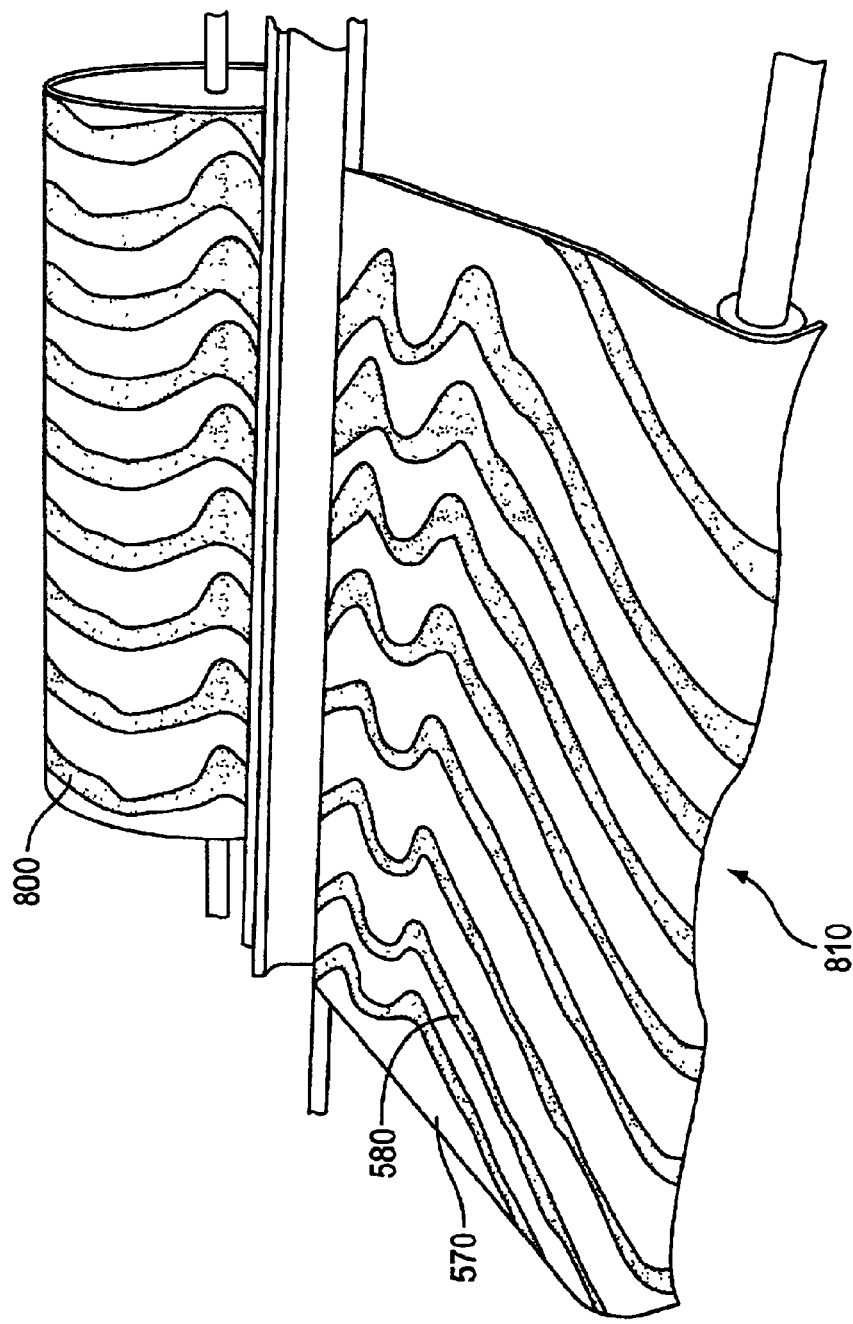
FIG. 7 is a perspective view of the sheet product produced by the instant invention.

As seen in FIG. 1, the segmented pre-foam stream 560 is then laid upon a surface assembly 900, preferably a conveyor. A plate or similar device 1000, can be used to reduce the disruption of the pre-foam stream 560 caused by the fall from the outlet of the mixing head 500. Additionally, variations in the angle of the plate or other device relative to the mixing head 500 or the angle of the mixing head 500 relative to the surface 900 may be utilized to reduce the impact, and thereby any intermixing, of the pre-foam stream 560. Further the height of the outlet of the mixing head above the surface can be varied. As seen in FIG. 5, the surface assembly 900, may have a form 1100, to hold the discretely striped, multi-propertied segmented bun as seen in FIG. 7. The discretely striped, multi-propertied segmented foam bun is then sectioned and peeled or cut off to produce a discretely striped, multi-segmented foam product, in this case a sheet. Alternatively, the discretely striped, multi-property segmented foam bun may be cut to produce and shape a product, for instance a rectangular block of discretely striped, multi-property segmented foam or the like, as shown in FIGS. 4a and 4b.

Operation

To practice the invention using the embodiment of FIGS. 1–3, the operator activates the non-reactant foam stream pumps, 100 through 400 and the mixer 520. With the starting of the isocyanate stream, the foaming reaction is initiated, as the non-reactant stream is thoroughly intermixed with the isocyanate as it passes over the mixer or similar device to promote intermixing.

As the pre-foam stream passes through the non-laminar region 525 of the mixhead 500, the controller 700 initiates the injection of the additive stream 600. The injector 630 is triggered by the movement of the three-way valve 620 that is actuated by the programmable controller 700 utilizing a programmed pattern. The operator may select any desirable injection pattern: slow, fast, regular or irregular. Preferably the additive 400 is injected in or near the region of laminar flow, as shown in FIG. 3, through injector 630 so as to minimize intermixing of the additive beyond the intended segment. The now segmented pre-foam stream 560 is poured from the mixing head 500 onto a surface 900 as show in FIG. 5. Typically, the mixing head 500 is operated in a static position and the surface 900 is moving in a direction to carry the segmented pre-foam stream 560 away from the mixing head 500, although other arrangements are possible to move the segmented pre-foam stream 560.

The segmented pre-foam stream 560 begins to set and cure into a striped, multi-propertied, segmented foam 800 atop the surface. Preferably the surface onto which the pre-foam stream 560 is poured is a moving conveyor with a form 1100 sitting atop it. The pre-foam stream 560 is allowed to set and cure on the conveyor taking the shape of the form 1100 into which it is conveyed. From the surface 900 the foam 800 is cut into buns. Preferably, a cylindrical form is used to create cylindrical buns, as shown in FIG. 7, although an ovoid, rectangular or other suitably shaped form can be used.

The foam 800 is then peeled, as shown in FIG. 6. A layer of variable thickness is removed from the circumference of the foam 800, as shown in FIG. 6, by a cutting blade 820. This results in a foam layer 810 of variable thickness having discrete, repeatable stripes of varying characteristics, as seen in FIG. 7. As seen in FIG. 7, the resulting foam layer 810 has repeatable, discrete, striped segments of varying properties 570, in this case color, interposed between segments 580 having a base property, in this case a base color. In a preferred process, the foam layer 810, can then be cut utilizing a cutter (not shown) to sever the continuous layer 810 into a repeatable, discretely striped, multi-property segmented foam sheet (not shown) of a specified length with segments 570, 580.

Foam Formation

The foaming process is initiated in the mixing chamber 500 as the non-reactant stream 515, including the pre-foam stream components and additives, is combined and thoroughly intermixes with the isocyanate stream 400. Preferably, the streams are passed over a mixing tree 520 to produce this intermixing, although any manner of intermixing device may be used. The resulting stream of material is a pre-foam stream 550. At a point preferably just after or near the end of the intermixing, in a laminar region of the mixing head 500, an additive stream 400 that changes the chemical composition of the pre-foam stream 550, for instance a chemical composition to change coloration, is injected at a pressure much greater than the pressure of the pre-foam stream 550. The injected additive stream 600 is introduced at the higher pressure and mixes across the entire cross-section of the pre-foam stream 550 forming a segmented stream 550. The injection is controlled and is repeatable in such a way that repeatable segments with varying properties appear in the pre-foam stream. The repeatable segments with varying properties are interposed between segments either having other properties varied from the base forumlation or the properties of the base formulation as dictated by the basic chemical composition of the pre-foam stream 550.

The segmented pre-foam stream 560 is then laid upon a surface 900, preferably a conveyor, which may have a form 1100 to hold it as it cures into a discretely striped, multi-property segmented foam 800, as seen in FIG. 5. The foam 800 is then sectioned and peeled or cut to produce a discretely striped, multi-property segmented foam product, in this case a sheet 810 shown in FIG. 8. Alternatively, the foam may be cut to produce any shape or product, for instance a rectangular block of discretely striped, multi-property segmented foam or the like as shown in FIG. 4*a* and FIG. 4*b*.

The invention is described in detail with respect to preferred embodiments, and it will now be apparent from the foregoing to those skilled in the art that changes and modifications may be made without departing from the invention and its broader aspects, and the invention, therefore, as defined in the claims is intended to cover all such changes and modifications as fall within the true spirit of the invention.

What is claimed is:

1. A foam product produced by a process comprising the steps of:

providing a pre-foam stream at a first pressure;

intermittently injecting at least one additive into the pre-foam stream in a mixing head at a pressure higher than the first pressure under mixing conditions, sufficient to provide for a laminar flow pre-foam stream with alternating segments;

pouring said laminar flow pre-foam stream onto a surface; and curing said pre-foam stream into a foam product having discrete alternating stripes with different properties.

2. A foam product of claim 1, wherein the at least one injector injects the additive into a laminar region of the pre-foam stream while substantially maintaining the laminar flow in the laminar region.

3. The foam product of claim 1, wherein the additive is a coloring agent, and the alternating stripes vary in color.

4. A foam product of claim 1, wherein the alternating stripes vary in at least one of width, density, hardness, air permeability, tensile strength and load bearing capacity properties of said foam.

5. The foam product of claim 1, wherein the foam product is a foam bun.

6. A foam product comprising an alternatingly, discretely striped foam sheet peeled from the foam bun of claim 5.

7. The product of claim 1, having two or more alternating stripes, having different properties.

8. An article comprising the foam product of claim 3, wherein the article is a clothing article or a blanket or an insulator.

9. The foam product of claim 1, wherein the stripes of the foam vary in chemical composition.

10. The foam product of claim 1, wherein the stripes of the foam vary in at least one physical property.

11. The foam product of claim 1, wherein the additive is a unique marker compound or combination of compounds that can be associated with the foam product as a unique identifier.

12. The foam product of claim 1, wherein the alternating stripes have edges that remain generally parallel to each other without intersecting each other.

13. The foam product of claim 1, wherein the article is a cushioning segment of the furniture industry.

* * * * *

UNITED STATES PATENT AND TRADEMARK OFFICE
CERTIFICATE OF CORRECTION

PATENT NO. : 6,767,932 B2
DATED : July 27, 2004
INVENTOR(S) : George J. Tolen et al.

It is certified that error appears in the above-identified patent and that said Letters Patent is hereby corrected as shown below:

Column 12,
Line 4, after the word "conditions" delete the comma ",";
Line 26, after the word "stripes" delete the comma ",".

Signed and Sealed this

First Day of February, 2005

JON W. DUDAS
*Director of the United States Patent and Trademark Office*